INVENTOR.
NEAL W. HURSH
BY William H. Meagher
Attorney

June 17, 1969 N. W. HURSH 3,450,935

PROTECTION CIRCUIT

Filed March 15, 1965 Sheet 2 of 2

INVENTOR.
NEAL W. HURSH
BY
William H. Meagher
Attorney

United States Patent Office 3,450,935

Patented June 17, 1969

3,450,935

PROTECTION CIRCUIT

Neal W. Hursh, Indianapolis, Ind., assignor to Radio Corporation of America, a corporation of Delaware Filed Mar. 15, 1965, Ser. No. 439,578

Int. Cl. H01j 29/74

U.S. Cl. 315—27

6 Claims

ABSTRACT OF THE DISCLOSURE

Protection circuit for color television receiver wherein raster pincushioning is corrected by saturable reactor circuits involving location of pincushion correction windings in connections to deflection yoke. Due to the presence of these windings, when kinescope ultor electrode arcs (e.g., under adverse operating conditions, or during servicing), large current pulse flowing through pincushion windings develops large amplitude voltage pulse that can damage components such as yoke "socket." Damage is precluded by shunting across pincushion windings a voltage dependent resistor (VDR). VDR resistance value under normal operating conditions is sufficiently large that VDR appears as an open circuit; when arcing occurs, resistance value drops to limit voltage buildup, with the VDR bypassing current pulse around pincushion windings.

This invention relates generally to protection circuit arrangements and, particularly, to arrangements for protecting components of a cathode ray tube deflection circuit from damage in the case of arcing by the final accelerating electrode of the cathode ray tube. In color kinescopes employed for the reproduction of color images in a color television receiver the final accelerating electrode structure (hereinafter called ultor electrode) includes an aquadag coating on the inner surface of the flared portion of the kinescope bulb and extending back to the forward end of the tube neck encircled by the associated deflection yoke. The ultor electrode is maintained at a high operating potential, e.g., 25 kv.

Under certain circumstances in operation, or, for example, during servicing, an arcing of the ultor electrode to the receiver chassis (or associated elements at chassis potential) can occur. While such arcing is a relatively rare occurrence, and the arc itself is rarely of damaging consequence, certain accompanying deleterious effects have been observed, particularly in connection with receivers employing relatively wide-angle (e.g., 90°) color kinescopes. The present invention is concerned with avoiding such deleterious consequences.

One particularly harmful consequence that has been found to accompany ultor electrode arcing in such receivers involves damage to the multi-terminal jack-plug type connector conventionally employed to provide a readily detachable coupling between the yoke (mounted on the kinescope) and its energizing circuits (mounted on the receiver chassis).

To appreciate the causal connection between ultor electrode arcing and damage to a yoke coupling element, it must be recognized that the configurations and spatial relations of the yoke and ultor electrode result in the formation of a "capacitor," with the yoke windings on the outside of the kinescope neck effectively forming one plate of the capacitor, the aquadag coating within the kinescope forming the other capacitor plate and the glass neck serving as the dielectric. The deflection winding side of the "capacitor" is connected via the deflection yoke connector to a point in the horizontal deflection circuit of B-boost potential (e.g., of approximately 800 volts). In normal operation, the yoke-ultor capacitor thus has a potential of the order of 24.2 kv. between its plates.

When the ultor electrode arcs to chassis ground, the yoke-ultor capacitor discharges through the deflection yoke connector and the appropriate deflection circuit path to the B-boost potential point. In receivers of the prior art employing relatively narrow-angle (e.g. 70°) color kinescopes, the return path to the B-boost point in the deflection circuit presented insignificant impedance to such a discharge current surge, and the discharge accordingly took place rapidly without component damage.

However, a different impedance picture may be presented where a wide angle kinescope deflection circuit is involved. In the development of relatively wide angle color kinescopes, the many stringent requirements imposed on the associated deflection yoke design have been found to necessitate yoke specifications that may result in so-called pincushion distortion of the color kinescope scanning raster. While a variety of solutions have been propounded for the problem of pincushion raster distortion, a particularly advantageous correction technique is one involving the use of saturable reactor apparatus to introduce appropriate correcting waveforms in the deflecting operation. Use of these techniques has involved the interposition of a saturable reactor winding or windings in the aforementioned yoke return path.

When the solution of pincushion correction dictates the presence of such a winding in the yoke return path, the condition of low impedance to capacitor discharge surges in such path is no longer obtained. Rather, the inductive winding tends to oppose, as a choke, the flow of the discharge current pulse. Stated otherwise, the pincushion correction circuit winding presents sufficient impedance to the discharge current to cause development of a relatively high voltage pulse thereacross. This pulse, appearing at the related terminal of the yoke connector, causes such a high voltage gradient to develop within the connector structure as to severely damage the connector.

The present invention, taking cognizance of the causal relationship of the pincushion winding presence to the yoke connector damage problem, incorporates in the deflection circuitry protective means with a characteristic suitable to preclusion of the development of the damaging voltage pulse when arcing would occur; however, the protection arrangement is so devised as to have substantially no effect on the deflection circuit operation under conditions of normal receiver operations. In accordance with a particular embodiment of the present invention these goals are achieved through the use of a voltage dependent resistor shunted across the offending pincushion correction winding or windings; the voltage dependent resistor characteristics are chosen such that under normal operating conditions, the resistor is of such a relatively high value as to effectively appear as an open circuit whereby substantially no effect on normal deflection circuit operations accompanies its presence. However, the voltage dependent resistor's characteristics provide for a sufficiently low value for the resistor under the abnormal conditions accompanying arcing as to provide a low impedance return path allowing the capacitor discharge current to flow without development of connector-damaging voltage pulses.

Accordingly, an object of the invention is to provide apparatus for protecting deflection circuit elements from damage under abnormal operating conditions.

A particular object of the present invention is to provide means for protecting elements of the deflection circuit of a wide angle color kinescope from damage in the case of ultor electrode arcing without substantially affecting normal deflection circuit operations.

Other objects and advantages of the present invention will be readily apparent to those skilled in the art after a reading of the following detailed description and an inspection of the accompanying drawings, in which.

Figure 1:
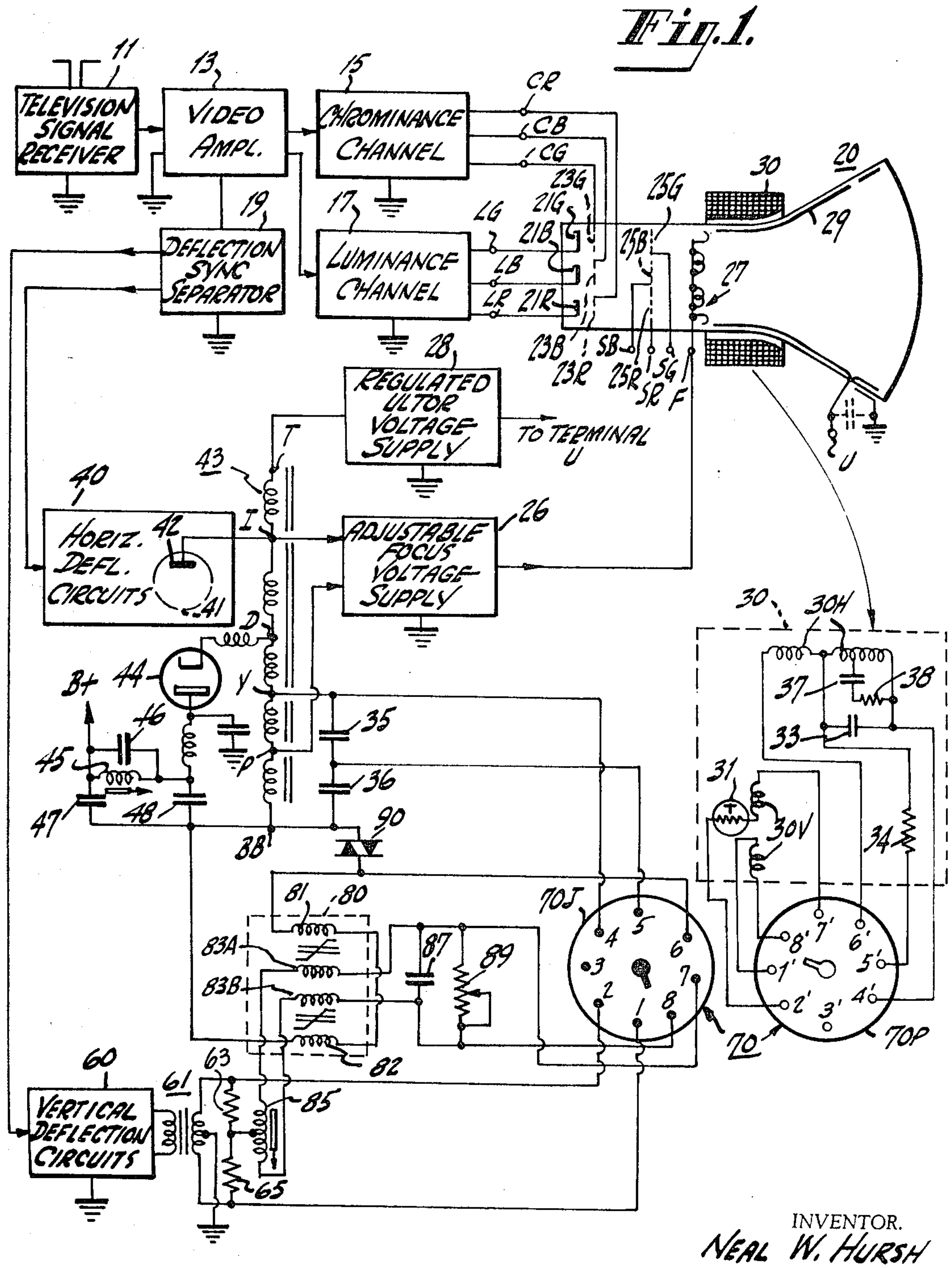
FIGURE 1 illustrates a color television receiver incor- ›rating a protection circuit arrangement in accordance ith an embodiment of the present invention.

In FIGURE 1, a color television receiver is illustrated, hich may, for example, be of the general form of the CA CTC–16 color television receiver (disclosed in the CA Service Data pamphlet designated 1964 No. T6). lock representations of a number of major segments of ıe receiver are employed for the purpose of simplifyıg the drawing; however, pertinent portions of the eceiver's deflection circuitry, incorporating pincushion orrection networks associated with a protection arrangeıent in accordance with an embodiment of the present ıvention, are illustrated schematically.

The receiver input segment, represented by the block 1, labeled "television signal receiver," selects a radiated olor television signal, converts the selected modulated F signal to intermediate frequencies, amplifies the resultnt modulated IF signal, and, by detection of the IF ignal, recovers a composite color video signal; i.e., it may omprise the usual lineup of tuner, IF amplifier and video etector. The composite color video signal output of eceiver segment 11 is supplied to a video amplifier 13, rom which is derived inputs for the receiver's chromiance channel 15, luminance channel 17, and deflection ync separator 19.

The chrominance channel 15, shown only in block orm, may comprise the usual circuitry associated with roper recovery of color-difference signal information rom the modulated color subcarrier which is a compoent of the composite color video signal output of video mplifier 13. Such circuitry generally comprises a bandass amplifier for selectively amplifying the color subarrier sidebands, a suitable array of synchronous detecors for demodulating the modulated color subcarrier nd matrix circuits for suitably combining the detector utputs to obtain a set of color-difference signals of the ppropriate form for application to the receiver's color mage reproducer. To effect the desired synchronous letection of the color subcarrier, there will be associated vith the chrominance channel detectors a local source of oscillations of subcarrier frequency and reference hase, as well as means for phase synchronizing this ocal oscillation source in accordance with the reference nformation of the burst component of the composite olor video signal.

The red, blue and green color-difference signal outputs of the chrominance channel 15 appear at respective output terminals CR, CB and CG, which are directly conected to the respective control grids, 23R, 23B and 23G, of the red, blue and green electron guns of a color kinescope 20, which is of the tri-gun, shadow-mask type (and, illustratively, of the previously discussed wideangle variety).

The color-difference signal drive of color kinescope 20 is complemented by the application of luminance information to the respective color kinescope cathodes 21R, 21B and 21G. Luminance channel 17, which may, in its usual form, comprise suitable wideband amplifier means for amplifying the luminance signal component of the composite color video signal processed by video amplifier 13, develops luminance signal outputs at respective output terminals LR, LB and LG for direct application to the respective kinescope cathodes 21R, 21B and 21G. Desirably, the luminance channel 17 may include means for adjusting the relative amplitudes of the luminance signal outputs appearing at the respective output terminals, for color balance purposes.

The color kinescope 20 additionally includes: individual screen grid electrodes 25R, 25B and 25G for the respective red, blue and green electron guns, each screen grid electrode being supplied with an operating D.C. potential (desirably individually adjustable) at the appropriate one of the energizing terminals SR, SB and SG; focusing electrode structure 27 for the electron gun trio, subject to common energization via the output terminal F of an adjustable D.C. source, the focus voltage supply 26 associated with the receiver's horizontal deflection circuits; and ultor electrode structure 29, adapted to operate at a high unidirectional voltage, supplied thereto via the output terminal U of a regulated ultor voltage supply 28, also associated with the receiver's horizontal deflection circuits.

A deflection yoke 30 is associated with the color kinescope 20 for the usual purpose of causing deflection of the kinescope's beams so as to trace a scanning raster on the kinescope screen. The yoke 30 is illustrated symbolically in position encircling the forward end of the kinescope neck, and is also illustrated in schematic detail in order to illustrate its circuit connections with its energizing sources.

The energizing sources of the yoke 30 comprise respective circuits for supplying suitably timed line and field frequency sawtooth current waveforms; such waveforms, however, may be supplemented or modified for pincushion correction purposes, as previously discussed. In the particular deflection circuit arrangement shown in FIGURE 1, the horizontal winding 30H of the yoke 30 is supplied with a line rate scanning waveform, without modification for pincushion correction purposes; however, the vertical winding 30V of yoke 30 is energized by a field rate scanning waveform supplemented by a "top and bottom" pincushion correcting waveform comprising a modulated line frequency component.

Sources of respective line rate and field rate scanning waveforms for yoke 30 comprise respective horizontal deflection circuits 40 and vertical deflection circuits 60. Major segments of these circuits are represented in the drawing solely by a block symbol; however, output circuit elements serving to transfer energy from the generating circuits 40 and 60 to the yoke 30 are illustrated in schematic detail.

The horizontal deflection circuits 40 include, as a yoke driving device, horizontal output tube 41 (partially illustrated) having an output electrode (anode 42) connected to an input terminal I of a horizontal output transformer 43. The transformer winding section extending between input terminal I and the end terminal BB serves as the primary winding for step-down autotransformer action coupling deflection energy to yoke 30. The winding section extending between terminal BB and the intermediate transformer tap Y serves as the secondary of the stepdown autotransformer, the horizontal yoke windings 30H being effectively coupled in shunt with this Y–BB winding section, as will be developed in greater detail subsequently.

Also coupled across a segment of transformer 43 is damper circuitry of well known function. The damper circuitry includes a damper diode 44, the cathode of which is coupled (via an RF choke) to a tap D positioned on the transformer 43 winding between input terminal I and yoke connection tap Y. The anode of damper diode 44 is connected (via an additional RF choke) to one end terminal of a variable inductance 45, which serves as a linearity or efficiency control; the other end terminal of the variable inductance 45 is connected to the receiver's B+ supply. The variable inductance 45 is shunted by a capacitor 46. A pair of capacitors, 47 and 48, are coupled between respective end terminals of variable inductance 45 and the the end terminal BB of transformer 43. In accordance with well-known power recovery principles which need not be detailed here, the periodic conduction of damper diode 44 develops a charge on capacitors 45 and 48, which effectively adds to the B+ potential, resulting in development of the so-called B-boost voltage at terminal BB.

In addition to the winding segments heretofore discussed, transformer 43 also includes a winding segment extending from its remaining end terminal T to the input terminal I. An input for a regulated ultor voltage supply 28 is derived from end terminal T. The supply 28 serves to rectify recurring flyback voltage pulses developed in the transformer 43 during retrace intervals; the flyback pulses appearing at terminal T have an augmented amplitude due to step-up autotransformer action, whereby the DC output at supply output terminal U is of the high level required for energization of the kinescope ultor electrode structure 29. Desirably, the supply 28 incorporates means for regulating the voltage output so that the ultor voltage remains relatively constant despite variations in load.

An additional kinescope electrode voltage supply operates in association with the transformer 43; viz, the adjustable focus voltage supply 26, which develops an adjustable DC voltage at its output terminal F for application to the focusing electrode structure 27. An advantageous form which the supply 26 may take is that shown in U.S. Patent No. 3,113,237, issued to J. C. Schopp and L. E. Annus on Dec. 3, 1963. In the operation of the focus voltage supply therein described, two flyback pulse inputs are utilized by the supply, one of relatively high voltage level and one of relatively low voltage level. In the circuit of the drawing herein, a high level flyback pulse input for supply 26 is shown as being derived via a connection to the input terminal I of transformer 43, while a low level pulse input for supply 26 is derived via a connection to the tap P, positioned on the transformer windings at a point intermediate the tapping point Y and the end terminal BB. Coupling of the step-down autotransformer secondary winding segment Y–BB to the horizontal winding 30H of the yoke 30 is effected by means including a multi-terminal jack-plug type of connector 70. Transformer terminal Y is directly connected to terminal 4 of the jack element 70J of the connector; the mating terminal 4′ of the plug element 70P is directly connected to one end of the horizontal yoke winding 30H. The opposite end terminal of winding 30H is connected to terminal 6′. The mating jack terminal 6 is returned to the transformer end terminal BB by a path inclusive of control windings 81 and 82 of the saturable reactor device 80 (to be subsequently discussed).

One half of the deflection winding 30H is shunted by a capacitor 33; the midpoint on deflection winding 30H is connected via resistor 34 (and via connector terminals 5′, 5) to the junction of a pair of capacitors 35 and 36, connected in series across the Y–BB transformer winding. These capacitive and resistive elements serve to eliminate or minimize so-called "ringing" effects, as explained more fully in U.S. Patent 2,869,030, issued to M. A. Deranian and B. B. Vonderschmitt on Jan. 13, 1959. For additional "ringing" correction purposes, a portion of the deflection winding that is shunted by capacitor 33 is paralleled by the series combination of capacitor 37 and resistor 38.

The vertical deflection circuits 60 are coupled to the vertical windings 30V of yoke 30 by means of a vertical output transformer 61. The secondary winding of transformer 61 (grounded at an intermediate tap) has respective end terminals connected to terminals 1 and 2 of the jack element 70J of the yoke connector 70. The corresponding terminals 1′ and 2′ of the plug element 70P of connector 70 are connected to respective end terminals of respective halves of the vertical yoke winding 30V. A thermistor 31 is serially included in one of these connections and serves familiar temperature compensation purposes. The remaining end terminals of the respective halves of the vertical yoke winding 30V are directly connected to terminals 7′ and 8′ of plug 70P. The corresponding jack terminals 7 and 8 are connected to elements of a "top and bottom" pincushion correction circuit. This circuit utilizes the aforementioned saturable reactor device 80 to introduce a modulated horizontal frequency component into the vertical yoke winding current.

Specifically, a current path is presented between jack terminals 7 and 8 which consists of the series combination of windings 83A and 83B (respective segments of the output winding of the saturable reactor device 80) and a variable inductor 85, with the variable inductor 85 placed between the respective output winding segments in the series combination. Shunting this inductive current path is a capacitor 87 in parallel with a variable resistor 89. The variable inductor 85 is provided with a center tap, which is directly returned to the junction of a pair of equal-valued damping resistors 63 and 65, the latter being connected in series across the secondary winding of vertical output transformer 61.

Reference may be made to the copending application of W. H. Barkow, Ser. No. 393,185, filed Aug. 31, 1964, now U.S. Patent No. 3,346,765, issued Oct. 10, 1967, for a detailed explanation of the functioning of the saturable reactor device 80 in effecting correction of pincushion distortion of the "top and bottom" type. For present purposes, however, it is believed that the following abbreviated explanation should suffice.

Illustratively, the reactor 80 comprises a two-window, three-leg core, with output winding segments 83A and 83B wound on the central core leg, and with respective halves 81, 82 of a control winding wound on respectively different outside core legs (disposed parallel to said central core leg). The effective poling of the respective control winding halves is such that, though energized by the same horizontal scanning current, they tend to drive flux through the central core leg in mutually opposing directions. Thus, when their respective flux contributions are matched in amplitude, there is complete flux cancellation of horizontal frequency flux variations in the central core leg, with the result that no horizontal frequency energy is transferred to the output winding segments 83A and 83B. However, should their respective flux contributions differ, cancellation in the central core leg will not take place, with the result that there is effective flux linkage between the output winding and one of the control winding halves; thus, horizontal frequency variations will be transferred to the output winding circuit by simple transformer action, the amplitude of the transferred variations depending upon the degree of difference in flux contributions, and the polarity depending upon which flux contribution is predominant.

In the illustrative circuit, dynamic control of the relative horizontal flux contributions is afforded by the vertical scanning current, itself, which flows through the output winding (83A and 83B) on the central core leg. During a first portion of the vertical scan cycle, when vertical scanning current is in a first direction (e.g., flowing from terminal 7 to terminal 8), it induces a flux that (1) opposes a bias flux in a core segment linking the central leg to one outside leg (thereby increasing the permeability of this core segment) and (2) adds to a bias flux in a core segment linking the central leg to the other outside leg (thereby lowering the permeability of this core segment). The reverse is true during a succeeding portion of the vertical scan cycle when the scanning reverses direction (e.g., flowing from terminal 8 to terminal 7).

Thus, horizontal frequency variations of one polarity are transferred to the output winding from one control winding segment with maximum amplitude at a first peak of vertical scanning current; maximum amplitude transfer in the opposite polarity occurs at the succeeding opposite direction peak of vertical scanning current. A polarity crossover occurs intermediate these peaks; a steady decrease in amplitude of the first polarity transfer occurs during approach of the crossover from the first peak, and a steady increase in amplitude of the opposite polarity transfer occurs subsequent to the crossover.

The modulated horizontal frequency component thus transferred to the output winding 83A, 83B is of the ɔrm appropriate to top and bottom pincushion correc-on. So that a magnitude of this modulated horizontal :equency component sufficient for correction purposes ıay be caused to appear in the vertical deflection wind-ıg 30V, high Q means are provided for resonating the utput winding 83A, 83B to the fundamental horizontal :equency. With such output winding tuning, a readily ttainable level of control winding voltage will develop ufficient horizontal frequency voltage across the output /inding to add the requisite horizontal frequency current omponent to the vertical scanning current in winding 0V. The horizontal frequency variations introduced will e essentially sinusoidal in shape, but it is observed that uch a shape sufficiently approximates the ideal parabolic vaveshape to effect an acceptable correction.

Capacitor 87 shunts the output winding 83A, 83B for he aforementioned fundamental tuning purposes. Means or adjusting the output winding tuning is provided by the 'ariable inductor 85. Given sufficient range of inductance 'ariation, variable inductor 85 ensures the ability to tune he output winding to a resonance range providing ade-|uate horizontal frequency energy transfer, and, more-ɔver, to tune the output winding within that range to prop-:rly phase the peaks of the horizontal frequency compo-ıent in winding 30V relative to the actual line scanning ntervals. With inductor 85 adjusted for efficient hori-:ontal frequency energy transfer and proper phasing of he transferred horizontal frequency component, the mag-ıitude of the correction effect may be controlled via ad-ustment of variable resistor 89 to alter the Q of the reso-ıant output winding circuit. Preferably, the output wind-ng segments 83A and 83B are bifilar wound, and, addi-ionally, the winding halves of variable inductor 85 are ılso bifilar wound. This enhances the Q of the output winding circuit to strengthen the efficiency of horizontal frequency energy transfer, and lessens vertical frequency power losses in the apparatus interposed in the vertical scanning path.

While the above-described saturable reactor circuitry provides a highly advantageous solution to the pincushion distortion problem its use has been found to pose a prob-lem with regard to the effects of ultor arcing, as previous-ly discussed. When the capacitor effectively formed be-tween the internal ultor coating and the external yoke windings attempts to discharge at the time of arcing, the discharge current flows through a path that includes the control winding segments 81 and 82 of saturable reactor 80. Unless otherwise avoided, as through use of the pres-ent invention, the passage of the capacitor discharge cur-rent will cause development of a high voltage pulse across the control winding segments, which pulse appears at terminals 6, 6′ of the yoke connector. The voltage level at these terminals will be so large, under these conditions, relative to the voltage level at nearby connector terminals as to cause destruction of the connector.

The present invention avoids such damage by preclud-ing the high level voltage pulse development. Such pre-clusion is achieved through the agency of a voltage de-pendent resistor (VDR) 90, which is connected across the series combination of control winding segments 81 and 82. The characteristics of VDR 90 are selected so that under normal operating conditions, the resistance of the element is sufficiently high (e.g., of the order of 220,000 ohms) as to appear essentially as an open circuit. How-ever, under arcing conditions, as the voltage across the control winding tends to rise toward a damaging value, this tendency will be opposed by a decrease in the resis-tance of VDR 90. The result will be to prevent the volt-age level at connector terminals 6, 6′ from rising beyond a safe level, with the capacitor discharge current being carried to a substantial extent by the VDR 90 in its low resistance state. As the capacitor discharge ceases, the VDR 90 returns to its high resistance value, permitting normal deflection circuit operation. Thus, advantage may be taken of the saturable reactor approach to pincushion correction without adverse effects under arcing conditions, the protection means being of such character as to avoid interference with normal deflection circuit operation.

Figure 2:
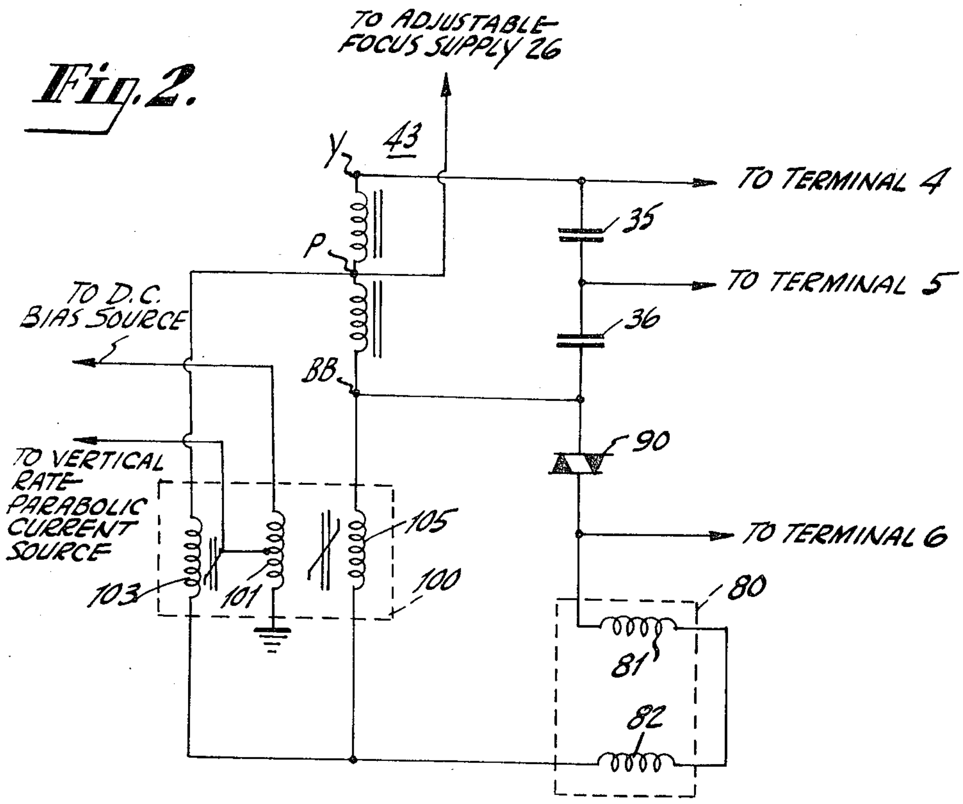
FIGURE 2 illustrates a modification of the FIGURE circuitry in accordance with a further embodiment of ıe present invention.

FIGURE 2 illustrates a modification of the circuitry of FIGURE 1, representing application of the principles of the present invention to a protection arrangement for deflection circuitry inclusive of "side" pincushion correc-tion apparatus as well as "top and bottom" pincushion correction apparatus. Only a portion of the deflection cir-cuitry is shown in FIGURE 2; the remainder may be sub-stantially as shown in FIGURE 1. Where component showings are repeated in FIGURE 2, the reference nu-merals employed in FIGURE 1 are re-employed.

In the modification of FIGURE 2, a second saturable reactor device 100 is shown in addition to the previously described saturable reactor device 80, device 100 serving a side pincushion correction purpose. The saturable re-actor device 100 includes a control winding 101 and a pair of output windings 103 and 105.

Respective winding halves of control winding 101 are fed in series with a bias current from a DC bias source (not shown). The respective control winding halves are additionally fed in parallel with a control current, com-prising a vertical rate wave-form of substantially para-bolic wave shape, from a suitable source (also not shown). Output winding 105 is connected as a series element in the path of the horizontal yoke winding cur-rent by virtue of connection of one end of winding 105 to transformer terminal BB, and connection of the op-posite end of winding 105 (via windings 81 and 82 of reactor 80) to yoke connector terminal 6. Output wind-ing 103 is connected effectively in shunt with a portion (viz., the P–BB portion) of the Y–BB transformer sec-ondary by virtue of the connection of one end of wind-ing 103 to transformer tap P, and by connection of the opposite end of winding 103 to the yoke side of output winding 105.

In a copending application of W. H. Barkow and R. M. Christensen, Ser. No. 393,249, filed Aug. 31, 1964, now U.S. Patent No. 3,329,861, issued July 4, 1967 a detailed explanation is presented of the apparatus 100, its operating principles and the manner in which it achieves side pincushion correction. Apparatus 100 may be generally characterized as saturable reactor apparatus employed as a constant load, dynamic width control. It is not believed to be necessary to present herein a full explanation of the magnetic structure of the saturable reactor apparatus 100, which preferably takes a 4-window core form; reference may be made to the aforementioned copending Barkow and Christensen application for such an explanation, if desired. It should be sufficient to note here that vertical rate current flowing through the con-trol winding 101 serves to vary in a differential manner the reactive impedances presented by the windings 103 and 105 for the respective currents flowing therethrough. The opposite variations in the respective reactive im-pedances cause opposite, cancelling effects on the load-ing of transformer 43, though achieving similar direc-tion, pincushion correcting effects on the current flow-ing through the horizontal yoke windings. The sources of bias and control currents for apparatus 100 in FIG-URE 2 may be as described in the aforementioned Barkow et al. application.

It will be noted that the character of the saturable reactor approach to side pincushion correction employed in the FIGURE 2 circuit involves interposition of a further winding (output winding 105) in the return path for the horizontal yoke winding 30H. For damage avoid-ance reasons previously discussed, it is desirable to avoid the development of a large voltage pulse across the addi-tional winding 105 under arcing conditions. Accordingly, in the FIGURE 2 circuit, VDR 90 is coupled across the series combination of windings 81, 82 and 105. Protec-tive action is achieved in the FIGURE 2 circuit in the same manner as previously described in connection with FIGURE 1. Illustratively, in a satisfactorily working embodiment of the FIGURE 2 circuit, a Carborundum type 334BNR–10 voltage dependent resistor was employed as VDR 90, with an Alcon Metal Products type 357LL–58 yoke socket serving as connector 70.

What is claimed is:

1. In a cathode ray tube system including a cathode ray tube having an accelerating electrode comprising a conductive coating on the interior surface of the tube envelope; means for supplying said accelerating electrode with a high unidirectional operating potential; and a deflection yoke encircling a segment of said tube envelope within which a portion of said coating extends, said deflection yoke including first and second windings having respective pairs of input terminals; said cathode ray tube system being occasionally subject to undesirable circumstances under which arcing from said accelerating electrode to a lower potential point takes place whereby said accelerating electrode rapidly drops from said high operating potential to said lower potential; the combination comprising:

a deflection wave source having a pair of output terminals;

means for coupling one of said windings between the output terminals of said source so that said source causes a deflection current to traverse said one winding;

said coupling means including a direct current conductive path linking one of the input terminals of said one winding and one of said output terminals of said source, said path being traversed by said deflection current during normal operation of said cathode ray tube system but also being subject to conveying an arc current surge under said occasional circumstances when arcing from said accelerating electrode takes place;

a circuit element included in said direct current conductive path having an impedance characteristic such as to oppose rapid changes in the current therethrough;

and deflection circuit protective means comprising a variable impedance element shunted across said circuit element, said impedance element presenting a sufficiently large impedance relative to the impedance of said circuit element, under said conditions of normal operation, as to bypass deflection current around said circuit element during said normal operation to an insignificant degree, and said variable impedance element presenting a sufficiently small impedance relative to the impedance of said circuit element, under said occasional circumstances when said arcing from said accelerating eletrode takes place, as to bypass arc current around said circuit element to an appreciable degree when said arcing takes place.

2. In a cathode ray tube system, including: a cathode ray tube having an accelerating electrode comprising a conductive coating on the interior surface of the tube envelope; means for supplying said accelerating electrode with a high unidirectional operating potential; and a deflection yoke, encircling a portion of said tube envelope within which a portion of said coating extends, for developing a scanning raster; said cathode ray tube system being occasionally subject to undesirable circumstances under which arcing from said accelerating electrode to a lower potential point takes place whereby said accelerating electrode rapidly drops from said high operating potential to said lower potential; the combination comprising:

deflection circuit means for energizing said deflection yoke, said deflection circuit means including a direct current conductive path between a winding of said deflection yoke and a point of unidirectional potential significantly lower than said high unidirectional operating potential;

means for correcting raster distortion comprising an inductance included in said direct current conductive path;

and deflection circuit protective means comprising a variable impedance element connected in parallel with said inductance means, said variable impedance element presenting a large impedance relative to the impedance of said inductance under conditions of normal operation of said deflection circuit means and said variable impedance element presenting a small impedance relative to the impedance of said inductance under said occasional circumstances when said arcing from said accelerating electrode takes place whereby substantial bypassing of current around said inductance occurs when said arcing takes place.

3. In a color television receiver including a color kinescope having an ultor electrode comprising a conductive coating on the interior surface of a portion of the kinescope envelope, an ultor voltage supply for supplying to said ultor electrode a high unidirectional operating potential, and a deflection yoke encircling a segment of said color kinescope envelope provided with said conductive coating on the interior surface thereof; apparatus comprising the combination:

deflection circuit means for supplying scanning waveforms to said deflection yoke to cause development of a scanning raster on the screen of said kinescope, said deflection circuit means including a direct current conductive path between elements of said yoke and a point of unidirectional potential significantly lower than said high unidirectional operating potential;

means for correcting distortion of said raster including inductive means interposed in said direct current conductive path;

a voltage dependent resistor;

and means for connecting said voltage dependent resistor in shunt with said inductive means, said voltage dependent resistor having an impedance value under conditions of normal operation of said deflection circuit means that is large compared with the impedance value of said inductive means, and the impedance value of said voltage dependent resistor decreasing significantly from said large impedance value upon the occurrence of arcing between said ultor electrode and a point of unidirectional potential significantly lower than said high unidirectional operating potential.

4. In a color television receiver including a color kinescope having an ultor electrode comprising a conductive coating on the interior surface of a portion of the kinescope envelope, an ultor voltage supply for supplying to said ultor electrode a high unidirectional operating potential, and a deflection yoke encircling a segment of said color kinescope envelope provided with said conductive coating on the interior surface thereof; apparatus comprising the combination of:

a deflection circuit for supplying a scanning waveform to said deflection yoke to cause development of a scanning raster on the screen of said kinescope, said deflection circuit including a direct current conductive path between elements of said yoke and a point of unidirectional potential significantly lower than said high unidirectional operating potential;

saturable reactor means for correcting pincushion distortion of said raster including a pair of windings serially interposed in said direct current conductive path;

a voltage dependent resistor;

and means for connecting said voltage dependent resistor in shunt with the series combination of said pair of windings, said voltage dependent resistor having an impedance value under conditions of normal operation of said deflection circuit that is large compared with the impedance value of said series combination and the impedance value of said voltage dependent resistor decreasing significantly from said large impedance value upon the occurrence of arcing between said ultor electrode and a point of unidirectional potential significantly lower than said high unidirectional operating potential.

5. In a color television receiver including a color kinescope having an ultor electrode comprising a conductive coating on the interior surface of a portion of the kinescope envelope; an ultor voltage supply for supplying an operating potential to said ultor electrode; and a deflection yoke, encircling a segment of said kinescope envelope within which a portion of said coating extends, for developing a scanning raster; deflection apparatus comprising the combination of:

a line rate scanning waveform source;
a field rate scanning waveform source;
means, including a connector device, for coupling said sources to said deflection yoke;
a source of unidirectional potential significantly lower than said ultor operating potential;
saturable reactor means for correcting distortion of said raster including respective input and output winding means;
said means for coupling including means for establishing a current path between said deflection yoke and said lower unidirectional potential source inclusive of elements of said connector device and one of said input and output winding means;
and means for bypassing current around said one winding means under abnormal operating conditions, said bypassing means comprising a voltage dependent resistor coupled in parallel with said one winding means and presenting a larger impedance relative to the impedance of said one winding means under normal operating conditions.

6. In a color television receiver including a color kinescope having an ultor electrode comprising a conductive coating on the interior surface of a portion of the kinescope envelope; an ultor voltage supply for supplying an operating potential to said ultor electrode; and a deflection yoke, encircling a segment of said kinescope envelope within which a portion of said coating extends, for developing a scanning raster; deflection apparatus comprising the combination of:

a line rate scanning waveform source;
a field rate scanning waveform source;
means, including a connector device, for coupling said sources to said deflection yoke;
first saturable reactor means for correcting side pincushion distortion of said raster including an input winding and a pair of output windings;
second saturable reactor means for correcting top and bottom pincushion distortion of said raster including a pair of input windings and an output winding;
said means for coupling including means for establishing a direct current conductive current path between said deflection yoke and a point of significantly lower potential than said ultor operating potential, said current path including, in series, one of said output windings of said side pincushion correcting means, said pair of input windings of said top and bottom pincushion correcting means, and elements of said connector device;
a voltage dependent resistor;
and means for shunting said voltage dependent resistor across the series combination of said one output winding of said side pincushion correcting means and said pair of input windings of said top and bottom pincushion correcting means.

References Cited

UNITED STATES PATENTS

| | | | |
|---|---|---|---|
| 2,761,090 | 8/1956 | Thalner | 315—27 |
| 3,061,757 | 10/1962 | Janssen et al. | 315—27 |
| 3,174,073 | 3/1965 | Massman et al. | 315—27 |
| 3,191,091 | 6/1965 | Pollak | 315—27 |
| 3,302,056 | 1/1967 | Presigig | 315—27 |
| 3,329,859 | 7/1967 | Lemke | 315—27 |

RICHARD A. FARLEY, *Primary Examiner.*

J. G. BAXTER, *Assistant Examiner.*